(12) United States Patent
Dimson et al.

(10) Patent No.: US 10,061,499 B2
(45) Date of Patent: Aug. 28, 2018

(54) SYSTEMS AND METHODS FOR PROVIDING INTERACTIVE TIME-LAPSE SELECTION FOR CAPTURED MEDIA CONTENT

(71) Applicant: Facebook, Inc., Menlo Park, CA (US)

(72) Inventors: Thomas Frederick Dimson, Stanford, CA (US); Alexandre Karpenko, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 410 days.

(21) Appl. No.: 14/542,431

(22) Filed: Nov. 14, 2014

(65) Prior Publication Data

US 2016/0139784 A1 May 19, 2016

(51) Int. Cl.
*G06F 3/0484* (2013.01)
*G06F 3/0485* (2013.01)
*G11B 27/00* (2006.01)

(52) U.S. Cl.
CPC ...... *G06F 3/04847* (2013.01); *G06F 3/04842* (2013.01); *G06F 3/04855* (2013.01); *G11B 27/00* (2013.01); *G06F 2203/04806* (2013.01)

(58) Field of Classification Search
CPC .................................................. G06F 3/04847
See application file for complete search history.

(56) References Cited

U.S. PATENT DOCUMENTS

| 6,005,564 | A  | * | 12/1999 | Ahmad | .................. | H04N 5/775 345/69 |
| 9,082,018 | B1 | * | 7/2015 | Laska | ................ | G06K 9/00711 |
| 9,313,556 | B1 | * | 4/2016 | Borel | ................. | H04N 21/8549 |
| 2013/0268196 | A1 | * | 10/2013 | Dam | ....................... | G01W 1/00 702/3 |
| 2015/0248916 | A1 | * | 9/2015 | Kopf | .................... | G11B 27/034 386/278 |
| 2016/0148648 | A1 | * | 5/2016 | Dimson | ................ | H04N 5/222 386/280 |
| 2016/0173782 | A1 | * | 6/2016 | Dimson | ............... | G11B 27/031 386/226 |
| 2017/0187954 | A1 | * | 6/2017 | Fukuya | .............. | H04N 5/23232 |

OTHER PUBLICATIONS

Karpenko, Alexandre, et al., "Digital Video Stabilization and Rolling Shutter Correction Using Gyroscopes." CSTR 1 (2011).*

* cited by examiner

*Primary Examiner* — Antoinette Spinks
(74) *Attorney, Agent, or Firm* — Sheppard Mullin Richter & Hampton LLP

(57) ABSTRACT

Systems, methods, and non-transitory computer-readable media can provide an interactive slider element for selecting a time-lapse amount for captured media content. A selection of the time-lapse amount can be received via the interactive slider element. A stabilized time-lapse media content item having the time-lapse amount associated with the selection can be generated based on the captured media content. The stabilized time-lapse media content item can be presented.

20 Claims, 10 Drawing Sheets

SYSTEMS AND METHODS FOR PROVIDING INTERACTIVE TIME-LAPSE SELECTION FOR CAPTURED MEDIA CONTENT

FIELD OF THE INVENTION

The present technology relates to the field of time-lapse media content. More particularly, the present technology relates to techniques for providing interactive time-lapse selection for captured media content.

BACKGROUND

Today, people often utilize computing devices (or systems) for a wide variety of purposes. Users can use their computing devices to, for example, interact with one another, create content, share information, and access information. In some instances, a user of a computing device can utilize a camera or other image sensor of the computing device to capture or record media content, such as images and/or videos. In one example, the user can utilize the camera to capture or record a time-lapse video.

Conventional approaches to capturing media content generally involve the user first configuring the camera (or other sensor) and then using the configured camera to capture the media content. Conventional approaches to capturing time-lapse media content can require the user to first set a time-lapse rate and then capture the time-lapse media content at the already set time-lapse rate. However, this can be uninteresting and lacking in interactivity. Moreover, under conventional approaches, if the user wishes to capture another time-lapse media content using a different time-lapse rate, then the user must set the time-lapse rate to the different rate prior to capturing the other time-lapse media. As such, conventional approaches can be inconvenient, inefficient, and uninteresting, and can create challenges for or reduce the overall user experience associated with utilizing computing devices (or systems) to capture media content.

SUMMARY

Various embodiments of the present disclosure can include systems, methods, and non-transitory computer readable media configured to provide an interactive slider element for selecting a time-lapse amount for captured media content. A selection of the time-lapse amount can be received via the interactive slider element. A stabilized time-lapse media content item having the time-lapse amount associated with the selection can be generated based on the captured media content. The stabilized time-lapse media content item can be presented.

In an embodiment, an efficient representation of the stabilized time-lapse media content item can be generated. The efficient representation can be presented during the generating of the stabilized time-lapse media content item. There can be a switch from the presenting of the efficient representation to the presenting of the stabilized time-lapse media content item when the generating of the stabilized time-lapse media content item has completed.

In an embodiment, the presenting of the efficient representation can be performed within an allowable time deviation from the receiving of the selection of the time-lapse amount via the interactive slider element.

In an embodiment, the generating of the efficient representation can further comprise approximating at least some orientations associated with frames to be included in the stabilized time-lapse media content item. The frames can be identified based on the time-lapse amount associated with the selection.

In an embodiment, a second selection of a second time-lapse amount can be received via the interactive slider element. A second stabilized time-lapse media content item having the second time-lapse amount associated with the second selection can be generated based on the captured media content. The second stabilized time-lapse media content item can be presented.

In an embodiment, the interactive slider element can provide a plurality of selectable time-lapse amount options. The selection of the time-lapse amount can correspond to one selectable time-lapse amount option out of the plurality of selectable time-lapse amount options.

In an embodiment, the plurality of selectable time-lapse amount options can include at least one of a 1× time-lapse amount option, a 2× time-lapse amount option, a 4× time-lapse amount option, a 6× time-lapse amount option, an 8× time-lapse amount option, a 10× time-lapse amount option, or a 12× time-lapse amount option.

In an embodiment, a first playback time associated with the captured media content can be presented. In some cases, a second playback time associated with the stabilized time-lapse media content item having the time-lapse amount can be presented.

In an embodiment, an indication of the time-lapse amount can be presented within an allowable time deviation from the receiving of the selection of the time-lapse amount. In some instances, the indication can fade over time.

In an embodiment, an option to store, at least temporarily, the stabilized time-lapse media content item can be provided.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
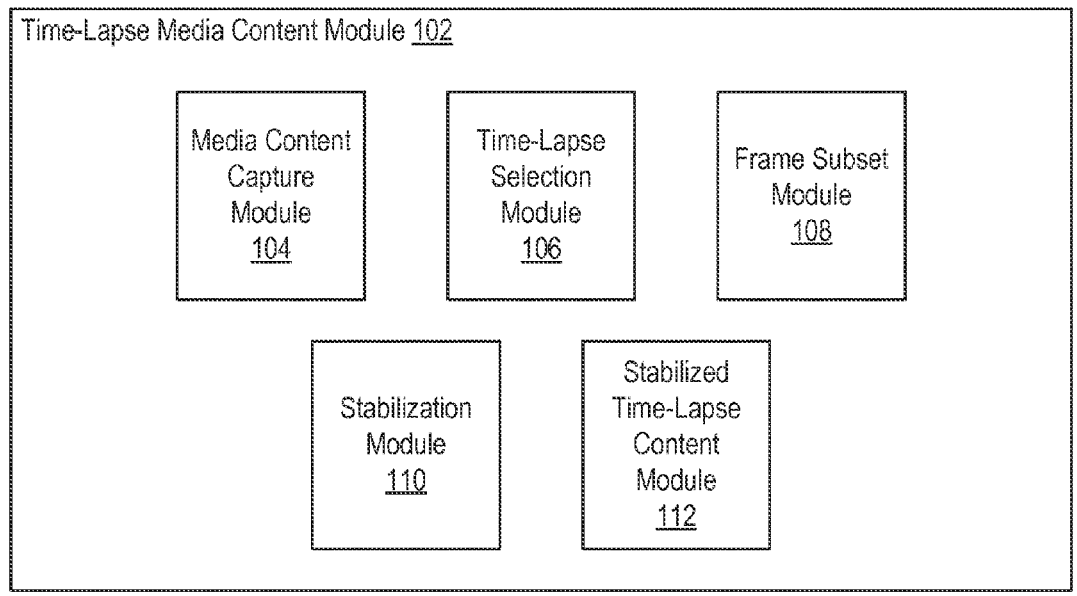
FIG. 1 illustrates an example system including an example time-lapse media content module configured to facilitate time-lapse selection subsequent to capturing media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Interactive Time-Lapse Selection for Captured Media Content

People use computing devices (or systems) for a wide variety of purposes. Computing devices can provide different kinds of functionality. Users can utilize their computing devices to produce information, access information, and share information. In some cases, computing devices can be utilized to capture or record media content, such as time-lapse media content.

Time-lapse media content can include, but is not limited to, time-lapse photographs or images, time-lapse videos, motion time-lapse media content, etc. Time-lapse media content can, for example, refer to media content that has been captured or recorded at a frame rate (frames per second) that is not greater than a frame rate at which the media content is played back or presented. In one example, under conventional approaches, a user of a computing device that corresponds to or includes a camera can configure the camera to capture time-lapse media content, such as by selecting a time-lapse amount for the camera. As a result, the time-lapse media content can be captured at the selected time-lapse amount, such as a recording rate that is selected to be ten times as much as a normal or default recording rate. Accordingly, in this example, every tenth still frame can be captured or recorded by the camera, and these still frames can be used to generate the time-lapse media content.

However, under conventional approaches, the user cannot view the captured time-lapse media content at a different time-lapse amount, such as at every fourth frame. Also, under conventional approaches, if the user desires to create another time-lapse media content with a new time-lapse amount, then the user has to reconfigure the camera (e.g., select the new time-lapse amount) and capture a new time-lapse media content with the reconfigured camera. Moreover, conventional image stabilization approaches can sometimes be unnecessarily computationally intensive. Furthermore, conventional approaches associated with time-lapse media content can be lacking in user interactivity. As such, these and other similar conventional approaches can be uninteresting, inefficient, and inconvenient.

Therefore, an improved approach can be beneficial for addressing or alleviating various concerns associated with conventional approaches. The disclosed technology enables interactive time-lapse selection for captured media content. Various embodiments of the present disclosure can provide an interactive slider element for selecting a time-lapse amount for captured media content. A selection of the time-lapse amount can be received via the interactive slider element. A stabilized time-lapse media content item having the time-lapse amount associated with the selection can be generated based on the captured media content. The stabilized time-lapse media content item can be presented.

FIG. 1 illustrates an example system 100 including an example time-lapse media content module 102 configured to facilitate time-lapse selection subsequent to capturing media content, according to an embodiment of the present disclosure. As shown in the example of FIG. 1, the time-lapse media content module 102 can include a media content capture module 104, a time-lapse selection module 106, a frame subset module 108, a stabilization module 110, and a stabilized time-lapse content module 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the time-lapse media content module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the time-lapse media content module 102 can be implemented, in part or in whole, as software running on one or more computing devices or systems, such as on a user or client computing device. For example, the time-lapse media content module 102 can be implemented as or within an application (e.g., app), a program, or an applet, etc., running on a user computing device or client computing system. In another example, the time-lapse media content module 102 can be implemented using one or more computing devices or systems that include one or more servers, such as network servers or cloud servers. In some instances, the time-lapse media content module 102 can, in part or in whole, be implemented within or configured to operate in conjunction with a social networking system (or service), such as the social networking system 930 of FIG. 9. It should be understood that many variations are possible.

The media content capture module 104 can be configured to facilitate capturing media content including an original set of frames. In some embodiments, the media content capture module 104 can be configured to operate with a camera utilized by or otherwise associated with the time-lapse media content module 102. The media content capture module 104 can cause the camera to capture media content, such as a video or a series of images (e.g., still frames). The images or still frames can correspond to the original set of frames. In one example, the media content including the original set of frames can be captured or recorded at 24 frames per second, 30 frames per second, 60 frames per second, or another suitable rate.

The time-lapse selection module 106 can be configured to facilitate receiving a selection of a time-lapse amount (or time-lapse rate). In some embodiments, the selection of the time-lapse amount can be from a user of the time-lapse media content module 102. In some implementations, the selection of the time-lapse amount can correspond to a default selection, a predefined selection, or a system selection. In some instances, the time-lapse amount can indicate how much time-lapse is to be applied to the captured media content including the original set of frames. In one example, if the selected time-lapse amount corresponds to "2×" (i.e., "×2", "times 2", etc.), then only every other frame in the original set of frames is relevant and the remaining frames are to be disregarded. As such, in this example, the second frame, the fourth frame, the sixth frame, etc., will be included in a time-lapse media content item generated based on the captured media content including the original frames and based on the 2× time-lapse amount selection, whereas the first frame, the third frame, the fifth frame, etc., will be disregarded. Alternatively, for example, the first frame, the third frame, the fifth frame, etc., can be included in the time-lapse media content item while the second frame, the fourth frame, the sixth frame, etc., are discarded.

In another example, if the selected time-lapse amount is "10×" (i.e., "×10", "times 10", etc.), then only every 10th frame in the original set is relevant and the other frames are disregarded. Accordingly, in this example, only the tenth frame, the twentieth frame, the thirtieth frame, etc., will be included in a time-lapse media content item generated based on the captured media content and the 10× selection. Alternatively, for example, the first frame, the eleventh frame, the twenty-first frame, etc., can be included in the time-lapse media content item while the other frames are disregarded. It should be understood that many variations are possible. More details regarding the time-lapse selection module 106 will be provided below with reference to FIG. 4.

The frame subset module 108 can be configured to facilitate identifying, based on the time-lapse amount, a subset of frames from the original set of frames. For example, as discussed above, if the time-lapse amount is selected to be "2×", then the subset of frames can be identified to include the second frame, the fourth frame, the sixth frame, and so forth (or alternatively, the first frame, the third frame, the fifth frame, etc.). In another example, as discussed previously, if the time-lapse amount is selected to be "10×", then the subset of frames can be identified to include the tenth frame, the twentieth frame, the thirtieth frame, and so forth (or alternatively, the first frame, the eleventh frame, the twenty-first frame, etc.). As such, based on the time-lapse amount, the subset of frames can exclude at least some frames from the original set of frames. The frame subset module 108 will be described in more detail below with reference to FIG. 2.

The stabilization module 110 can be configured to facilitate applying an orientation-based image stabilization process to the subset of frames to produce a stabilized subset of frames. For example, the orientation-based image stabilization process can utilize, as input, the subset of frames and orientation data associated with the subset to frames to produce or output the stabilized subset of frames. More details regarding the stabilization module 110 will be provided below with reference to FIG. 3.

Moreover, the stabilized time-lapse content module 112 can be configured to facilitate providing a stabilized time-lapse media content item based on the stabilized subset of frames. In some implementations, the stabilized time-lapse content module 112 can be configured to facilitate utilizing, at least in part, the stabilized subset of frames to generate the stabilized time-lapse media content item. In some embodiments, the stabilized time-lapse content module 112 can be configured to facilitate presenting or displaying the stabilized time-lapse media content item generated based on the stabilized subset of frames. In one example, the stabilized time-lapse content module 112 can generate and provide a preview of the stabilized time-lapse media content item. It is appreciated there can be many variations, applications, and/or other possibilities. For example, in some cases, the stabilized time-lapse content module 112 can facilitate sharing the stabilized time-lapse media content item via at least one social networking system.

Furthermore, in some embodiments, a second selection of a second time-lapse amount can be received. For example, the time-lapse selection module 106 can receive the second selection of the second time-lapse amount from a user of the time-lapse media content module 102. The second time-lapse amount can be different from the previous time-lapse amount. Based on the second time-lapse amount, a second subset of frames can be identified from the original set of frames. In this example, the frame subset module 108 can identify, based on the second time-lapse amount, the second subset of frames from the original set of frames. Since the second time-lapse amount is different from the first time-lapse amount, at least some frames in the second subset can be different from at least some frames in the previous subset and different from at least some frames in the original set. Further, the orientation-based image stabilization process can be applied to the second subset of frames to produce a stabilized second subset of frames. The stabilization module 110 can, for example, utilize orientation data associated with the second subset and apply the orientation-based image stabilization process to the second subset of frames to produce the stabilized second subset of frames. A second stabilized time-lapse media content item can be provided based on the stabilized second subset of frames. For example, based on the stabilized second subset of frames, the stabilized time-lapse content module 112 can generate and present a second stabilized time-lapse media content item. It is contemplated that many variations are possible.

Figure 2:
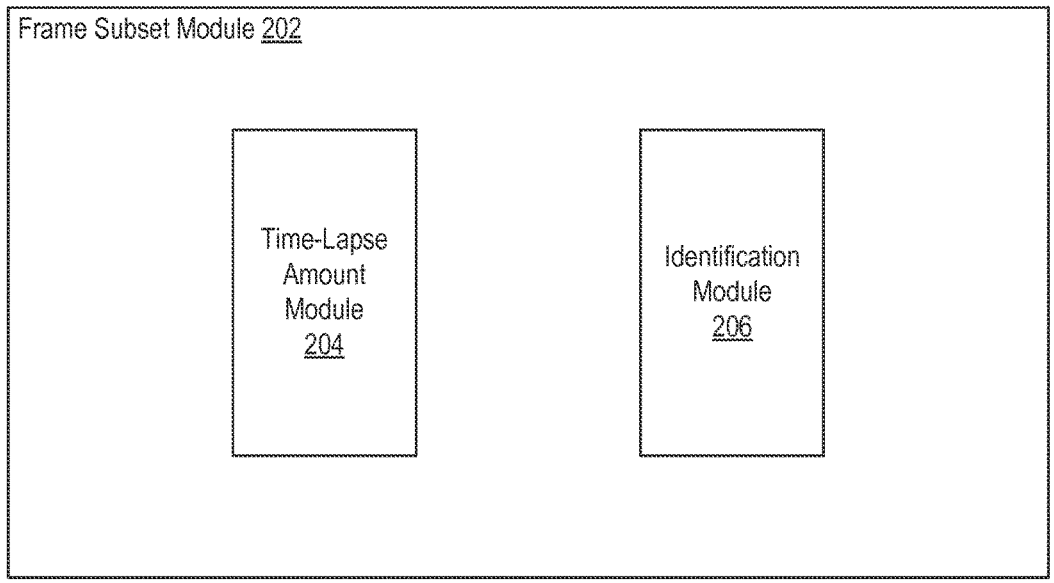
FIG. 2 illustrates an example frame subset module configured to facilitate time-lapse selection subsequent to capturing media content, according to an embodiment of the present disclosure.

FIG. 2 illustrates an example frame subset module 202 configured to facilitate time-lapse selection subsequent to capturing media content, according to an embodiment of the present disclosure. In some embodiments, the frame subset module 108 of FIG. 1 can be implemented as the example frame subset module 202. In some instances, the example frame subset module 202 can be configured to identify, based on the time-lapse amount, a subset of frames from the original set of frames, as discussed above. As shown in FIG. 2, the frame subset module 202 can include an identification module 204 and a time-lapse amount module 206.

The time-lapse amount module 204 can be configured to acquire a time-lapse amount on which the identifying of the subset of frames can be based. In some embodiments, a selection of the time-lapse amount can be received by the time-lapse selection module 106 of FIG. 1 and the time-lapse selection module 106 can provide the time-lapse amount, received in the selection, to the time-lapse amount module 204.

The identification module 206 can communicate and/or operate in conjunction with the time-lapse amount module 204 to utilize the time-lapse amount in identifying the subset of frames. In some cases, if the time-lapse amount is associated with a numeric value N, then the identification module 206 can identify every N-th frame from the original set to be included in the subset. For example, if the time-lapse amount corresponds to "2" (e.g., "2×", "×2", "times 2", etc.), then the identification module 206 can identify the second frame, the fourth frame, the sixth frame, etc., from the original set, while disregarding the others. As such, in this example, a 2× time-lapse media content item can be generated based (at least in part) on the subset of frames including the second frame, the fourth frame, the sixth frame, etc.

Figure 3:
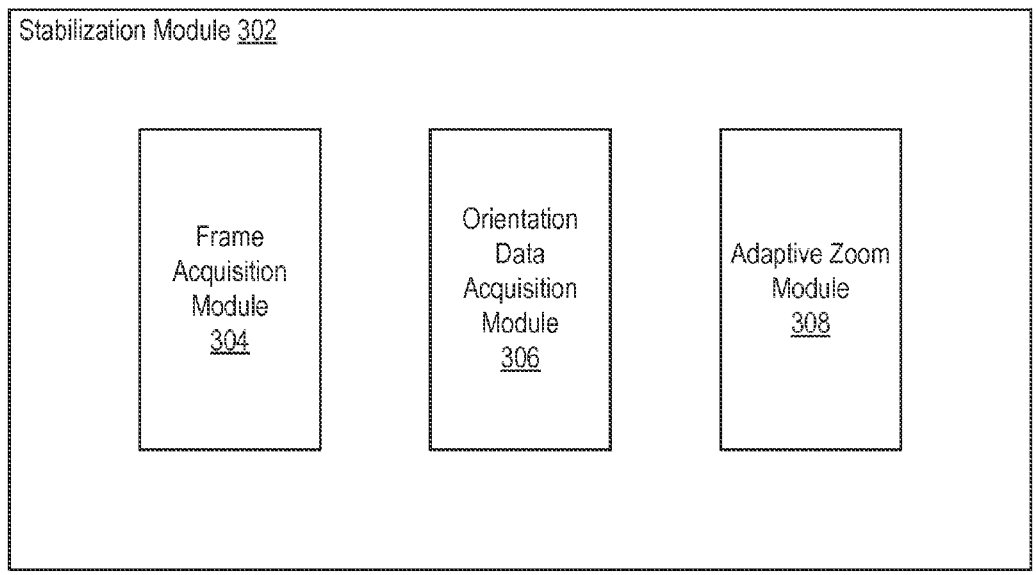
FIG. 3 illustrates an example stabilization module configured to facilitate time-lapse selection subsequent to capturing media content, according to an embodiment of the present disclosure.

FIG. 3 illustrates an example stabilization module 302 configured to facilitate time-lapse selection subsequent to capturing media content, according to an embodiment of the present disclosure. In some embodiments, the stabilization module 110 of FIG. 1 can be implemented as the example stabilization module 302. In some cases, the example stabilization module 302 can be configured to apply an orientation-based image stabilization process to the subset of frames to produce a stabilized subset of frames, as discussed previously. As shown in FIG. 3, the stabilization module 302 can include a frame acquisition module 304, an orientation data acquisition module 306, and an adaptive zoom module 308.

The frame acquisition module 304 can be configured to acquire a set of frames to be stabilized (and to acquire information associated with the frames). In some embodiments, the frame acquisition module 304 can acquire the subset of frames identified by the identification module 206 of FIG. 2. The frame acquisition module 304 can also acquire time information associated with the frames, such as time data for each frame in the subset of frames. For example, the frame acquisition module 304 can acquire a respective timestamp for each frame in the subset.

The orientation data acquisition module 306 can be configured to facilitate acquiring orientation data indicative of one or more orientations of a camera. The camera can correspond to the camera configured to capture the media content including the original set of frames, as discussed above. In some cases, the camera can undergo movement that causes the one or more orientations of the camera to change over time. For example, when the camera is held by a user, the camera can experience shaking from the user's hand. In another example, the camera can experience one or more changes in orientation when the user walks, runs, jumps, etc., while using the camera. In a further example, when the camera is used on a transportation vessel (e.g., bicycle, automobile, boat, airplane, etc.), the camera can also undergo movement. The orientation data acquisition module 306 can acquire orientation data associated with the camera, which can indicate changes in the camera's orientation. In addition, the orientation data can include timestamps such that the stabilization module 302 can determine the camera's orientation at a particular time.

In some implementations, the orientation-based image stabilization process can utilize at least a portion of the orientation data. The portion of the orientation data utilized by the orientation-based image stabilization process can be associated with the time data for each frame in the subset of frames. For example, the orientation-based image stabilization process can utilize the portion of the orientation data that has timestamps corresponding to the timestamps of the subset of frames.

Based on at least the portion of the orientation data and the subset of frames, the orientation-based image stabilization process can produce a stabilized time-lapse media content item. In some embodiments, the orientation-based image stabilization process can utilize a set of image frames having associated time stamps. The set of image frames can be included, for example, in digital video data. In one example, the set of image frames can correspond to the subset of frames identified from the original set of frames included in the captured media content. Applying the stabilization process to only the subset can be more efficient and can produce better stabilization results than attempting to stabilize the entire original set of frames included in the captured media content.

Moreover, the orientation-based image stabilization process can utilize a set of camera orientation data having associated time stamps. As discussed, the orientation-based image stabilization process can, for example, utilize at least the portion of the orientation data that is associated with the time data for each frame in the subset of frames. The orientation-based image stabilization process can also generate a smoothed set of camera orientation data by minimizing a rate of rotation between successive image frames while minimizing empty regions below a threshold. Furthermore, the orientation-based image stabilization process can warp the set of image frames based on the smoothed set of camera orientation data. Accordingly, the orientation-based image stabilization process can produce the warped set of image frames, from which the stabilized time-lapse media content item is generated or developed. It should be appreciated that there can be many variations, applications, and/or other possibilities.

In some cases, the stabilized time-lapse media content item can correspond to a stabilized hyperlapse media content item. For example, when the media content including the original set of frames is captured while the camera is moved across a distance over a duration of time, the stabilized time-lapse media content item can be produced as a stabilized hyperlapse media content item.

Furthermore, in some implementations, the orientation-based image stabilization process can include utilizing the adaptive zoom module 308 to apply adaptive zoom with respect to the subset of frames to produce the stabilized subset of frames. The adaptive zoom can be dependent upon at least the portion of the orientation data. In some cases, the adaptive zoom can include a technique for cropping or zooming frames, such as the subset of frames identified from the original set of frames. The adaptive zoom can allow individual frames to be translated, rotated, or warped to counteract undesired deformations introduced by hand shake or other undesirable changes in orientation. The amount of cropping or zooming can determine how much leeway (or "wiggle room") is available to remove or reduce these deformations. If, for example, a particular frame is translated too far, empty regions (e.g., regions which have no pixel data) can be visible. The orientation-based image stabilization process can smooth out undesirable camera motion by counteracting changes in camera orientation, and can do so while preventing empty regions from showing up. The adaptive zoom can attempt to achieve an optimal or suitable zoom depending on the amount of changes in orientation.

For example, if the camera had undergone significant orientation changes, such as rotations (e.g., clockwise and/or counterclockwise relative to a lens of the camera), while capturing the media content, then the adaptive zoom can increase the zooming or cropping of the frames in the identified subset. If, however, the camera had undergone slight orientation changes (e.g., rotations), then the adaptive zoom can utilize a lesser zooming or cropping of the frames in the identified subset. There can be many variations and other possibilities.

Figure 4:
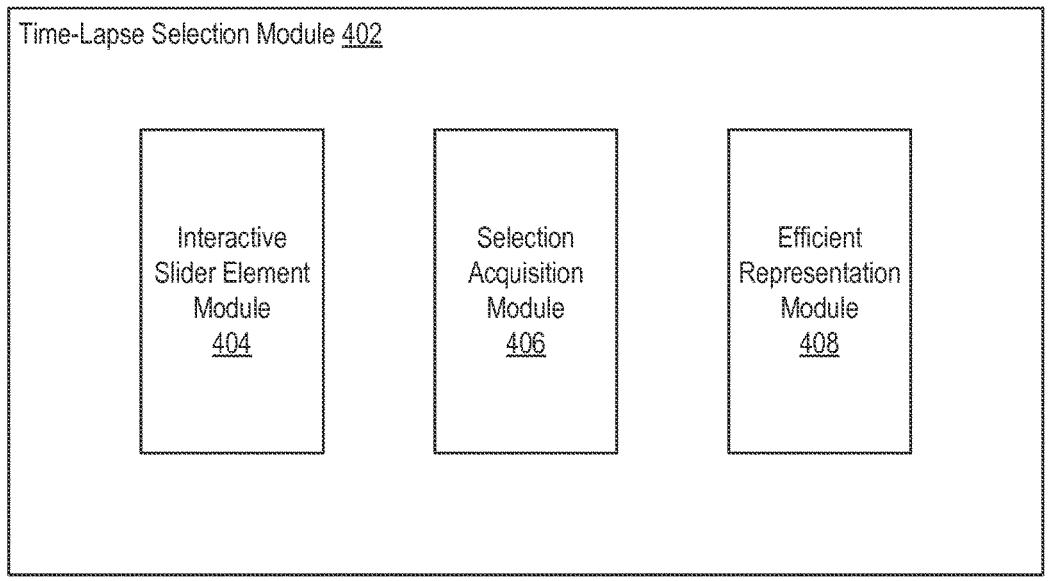
FIG. 4 illustrates an example time-lapse selection module configured to facilitate providing interactive time-lapse selection for captured media content, according to an embodiment of the present disclosure.

FIG. 4 illustrates an example time-lapse selection module 402 configured to facilitate providing interactive time-lapse selection for captured media content, according to an embodiment of the present disclosure. In some embodiments, the time-lapse selection module 106 of FIG. 1 can be implemented as the example time-lapse selection module 402. As shown in FIG. 4, the time-lapse selection module 402 can include an interactive slider element 404 and a selection acquisition module 406. In some embodiments, the time-lapse selection module 402 can include an efficient representation module 408.

The interactive slider element module 404 can be configured to facilitate providing an interactive slider element for selecting a time-lapse amount for captured media content. In one example, the interactive slider element module 404 can render, generate, or otherwise provide the interactive slider element or slide bar, which can include a slider (e.g., sliding icon, sliding knob, etc.) as well as a slide path (e.g., track, bounded pathway, etc.) through which the slider can be moved. The slider and the slide path can be presented on a display of a computing device or system, which can also be associated with a camera for capturing the media content. The display can, for example, correspond to a touch screen or touch display. As such, a user can interact with the interactive slider element by using his or her finger to touch and move the slider across the touch screen.

In some implementations, the interactive slider element can provide a plurality of selectable time-lapse amount options. Each of the selectable time-lapse amount options can correspond to a discrete position along the slide path. In some cases, the slide path can correspond to an interface element displayed as a bounded maneuverable path for the slider. In one example, there can be seven selectable time-lapse amount options where each of the seven options is spaced equally apart from an adjacent option. In some instances, the plurality of selectable time-lapse amount options includes at least one of a 1× time-lapse amount option, a 2× time-lapse amount option, a 4× time-lapse amount option, a 6× time-lapse amount option, an 8× time-lapse amount option, a 10× time-lapse amount option, or a 12× time-lapse amount option. In other examples, other numbers of selectable time-lapse amount options can be provided.

Moreover, the selection acquisition module 406 can be configured to facilitate acquiring or receiving a selection of the time-lapse amount via the interactive slider element. As discussed above, the interactive slider element can, for example, provide a plurality of selectable time-lapse amount options. The selection of the time-lapse amount, received or acquired by the selection acquisition module 406, can correspond to one selectable time-lapse amount option out of the plurality of selectable time-lapse amount options.

In one example, the interactive slider element provided by the time-lapse selection module 402 can enable the user to touch and hold down his or her finger on the slider presented via the touch screen. The user can move the slider with his or her finger to a particular slide path position. For example, when the user moves the slider to a particular slide path position corresponding to 4×, the selection acquisition module 406 can receive or acquire a selection of the 4× time-lapse amount.

Continuing with the example, subsequent to receiving the selection of the 4× time-lapse amount, a stabilized time-lapse media content item having the time-lapse amount (e.g., 4×) associated with the selection can be generated based on the captured media content. In some cases, the stabilized time-lapse content module 112 of FIG. 1 can facilitate the generating of the stabilized time-lapse media content item.

Furthermore, the stabilized time-lapse media content item can be presented, such as by the stabilized time-lapse content module 112.

Additionally, in some embodiments, the efficient representation module 408 can be configured to facilitate generating an efficient representation of the stabilized time-lapse media content item. In some instances, the generating of the stabilized time-lapse media content item can take some time, whereas the efficient representation can be generated much more quickly. As such, the efficient representation module 408 can generate and present the efficient representation within an allowable time deviation from the receiving of the selection of the time-lapse amount via the interactive slider element. For example, the efficient representation module 408 can generate and present the efficient representation substantially immediately (e.g., appearing to be instantaneously or near instantaneously) subsequent to the receiving of the selection of the time-lapse amount.

The efficient representation can be presented during the generating of the stabilized time-lapse media content item. In some cases, the efficient representation can be presented repeatedly. When the generating of the stabilized time-lapse media content item has completed, the efficient representation module 408 can cause the presenting of the efficient representation to be switched to the presenting of the stabilized time-lapse media content item.

As discussed previously, the generating of the stabilized time-lapse media content item can involve acquiring and analyzing orientation data associated with frames, identified based on the selected time-lapse amount, to be included in the stabilized time-lapse media content item. The analyzing of the orientation data can cause orientations (or representations thereof) associated with the frames to be determined. In some cases, the efficient representation module 408 can generate the efficient representation based on approximating at least some of the orientations associated with the frames to be included in the stabilized time-lapse media content item. For example, an orientation of a frame temporally between two other frames with two other orientations can be approximated by interpolating between the two other orientations. Accordingly, the efficient representation can be generated more quickly than the stabilized time-lapse media content item, and the efficient representation can be presented while the stabilized time-lapse media content item is still being generated. In some cases, the efficient representation can, for example, be generated based on dropping or removing certain frames from another previously generated efficient representation. It should be appreciated that many variations are possible.

Furthermore, in some implementations, the selection of the time-lapse amount can correspond to a default selection, a predefined selection, or a system selection, as discussed above. In one example, subsequent to the media content being captured or recorded, a time-lapse media content item having a default selection of, for example, a 6× time-lapse amount can be generated and presented. When the user selects a new time-lapse amount, another time-lapse media content item having the newly selected time-lapse amount can be generated and presented. Again, it is contemplated that many variations are possible.

Figure 5:
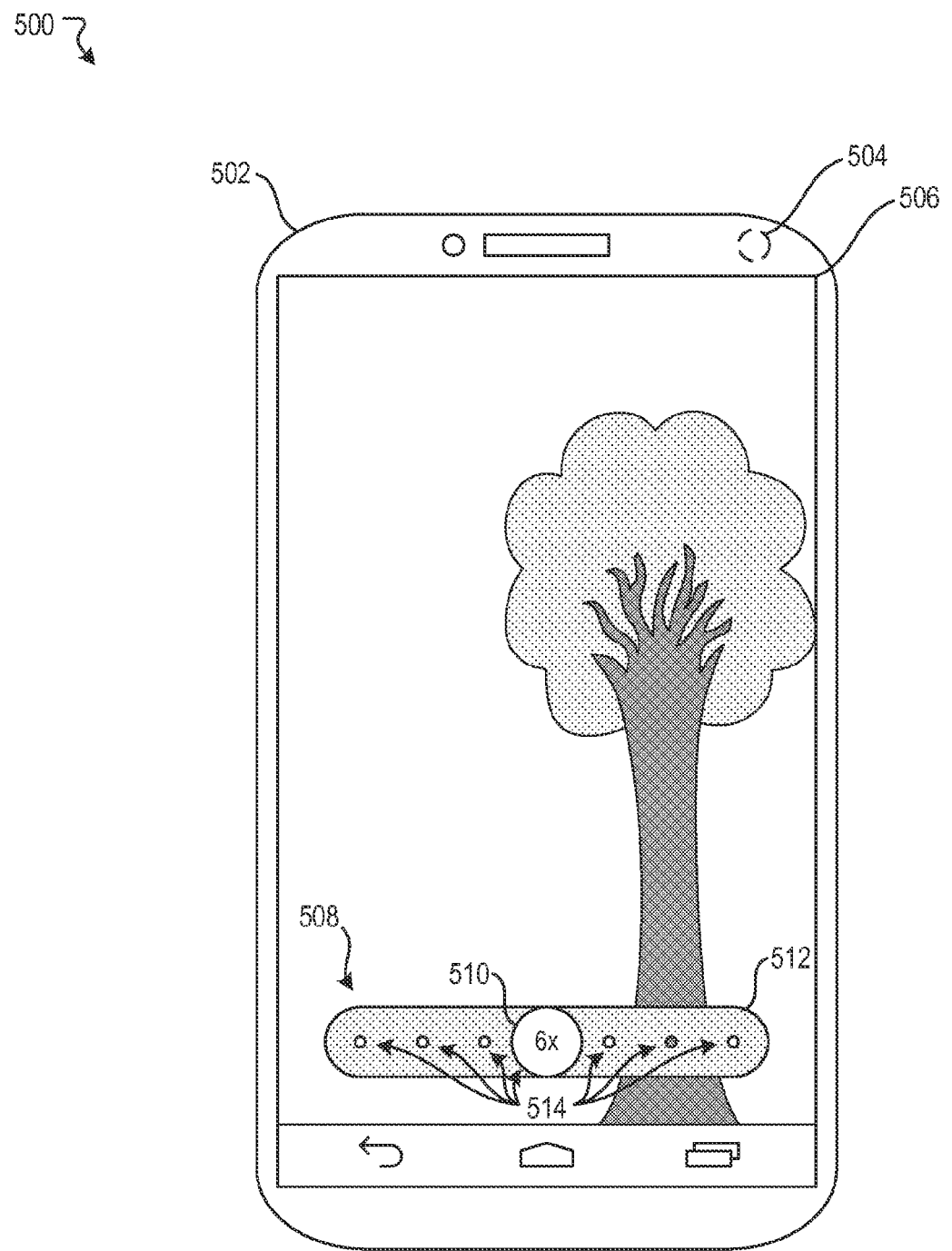
FIG. 5 illustrates an example scenario associated with providing interactive time-lapse selection for captured media content, according to an embodiment of the present disclosure.

FIG. 5 illustrates an example scenario 500 associated with providing interactive time-lapse selection for captured media content, according to an embodiment of the present disclosure. The example scenario 500 illustrates an example computing device (or system) 502. The example computing device 502 can include at least one camera, such as a rear-facing camera 504. The at least one camera 504 can be configured to capture media content, from which a time-lapse media content item can be generated. The computing device 502 can also include a display, such as a touch display or touch screen 506.

As shown, the computing device 502 can be configured to provide an interactive slider element 508 for selecting a time-lapse amount for captured media content. In the example scenario 500, the interactive slider element 508 can include a slider or sliding icon 510 as well as a slide path or track 512. The slider or sliding icon 510 can be moved through the slide path or track 512, such as by a user's finger gliding across the touch screen 506.

The interactive slider element 508 can provide a plurality of selectable time-lapse amount options, such as in the form of discrete slide path positions (e.g., items 514). In this example, each of the discrete slide path positions can respectively correspond to one of a 1× time-lapse amount option, a 2× time-lapse amount option, a 4× time-lapse amount option, a 6× time-lapse amount option, an 8× time-lapse amount option, a 10× time-lapse amount option, and a 12× time-lapse amount option. When the slider 510 is moved to and/or positioned at one of the slide path positions, the corresponding time-lapse amount can be selected. In the example scenario 500, the selected time-lapse amount can correspond to 6× and can be associated with the middle slide path position.

Figure 6:
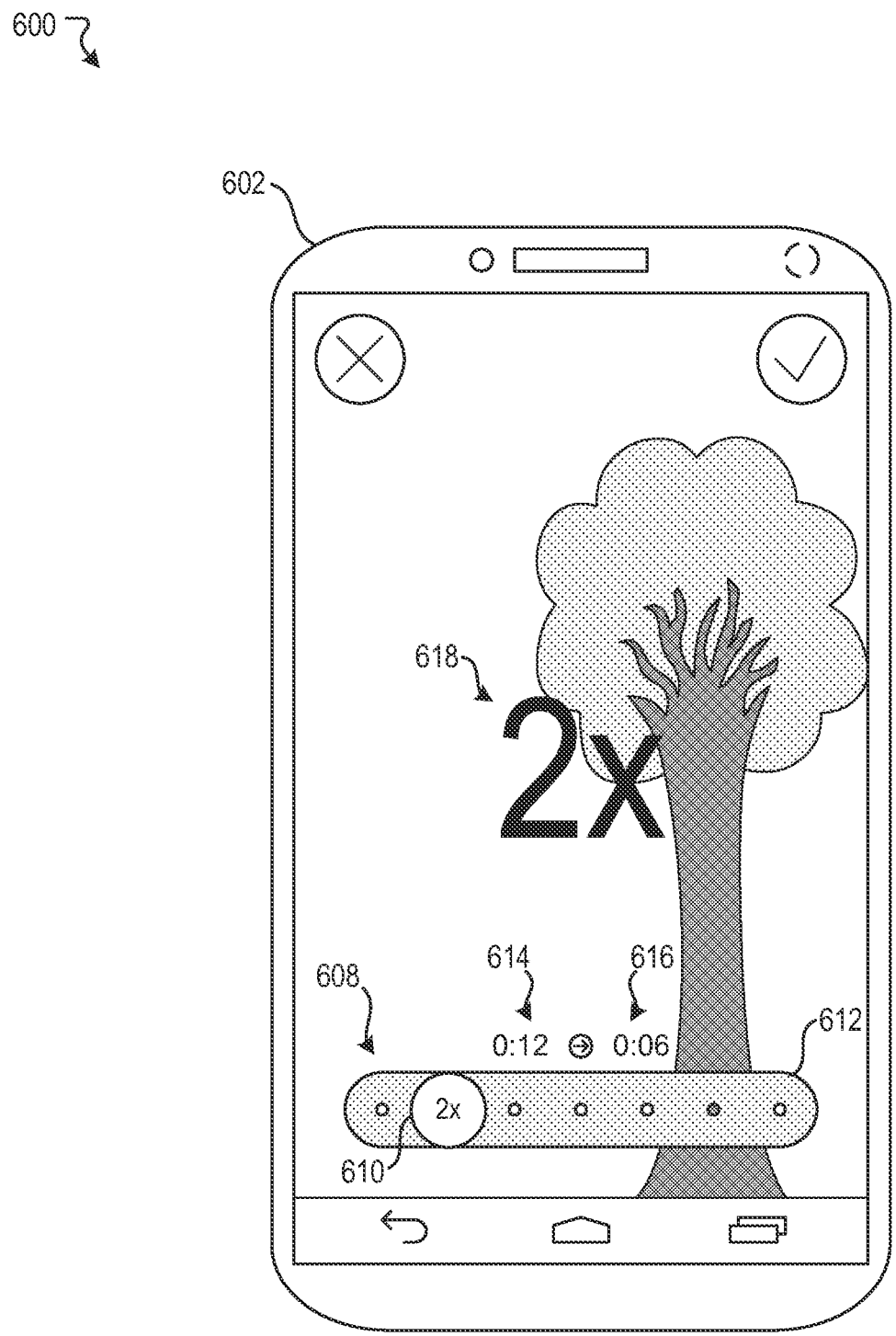
FIG. 6 illustrates an example scenario associated with providing interactive time-lapse selection for captured media content, according to an embodiment of the present disclosure.

FIG. 6 illustrates an example scenario 600 associated with providing interactive time-lapse selection for captured media content, according to an embodiment of the present disclosure. The example scenario 600 illustrates an example computing device (or system) 602 configured to provide an interactive slider element 608 for selecting a time-lapse amount for captured media content. The interactive slider element 608 can include a slider 610 and a slide path 612. In this example scenario 600, the slider 610 has been moved to a slide path position corresponding to a 2× time-lapse amount. As a result, the slider 610 can display "2×", the 2× time-lapse amount can be selected, and a stabilized time-lapse media content item can be generated based on the 2× time-lapse amount.

In some embodiments, a first playback time 614 associated with the captured media content can be presented. The first playback time 614 can correspond to a playback duration or length of the original (non-time-lapse) media content that was captured. A second playback time 616 associated with the stabilized time-lapse media content item having the time-lapse amount can be presented. In this example, the original media content can have a playback length of 12 seconds. When the 2× time-lapse amount is selected, the playback length of the time-lapse media content item can correspond to 6 seconds. In addition, when the selection of the time-lapse amount is changed, the second playback time can be updated accordingly.

In some implementations, an indication 618 of the time-lapse amount can be presented within an allowable time deviation from the receiving of the selection of the time-lapse amount. For example, substantially immediately after moving the slider 610 to the slide path position corresponding to the 2× time-lapse amount, an indication 618 of "2×" can be displayed. In some instances, the indication can fade over time, such as by gradually disappearing.

Figure 7:
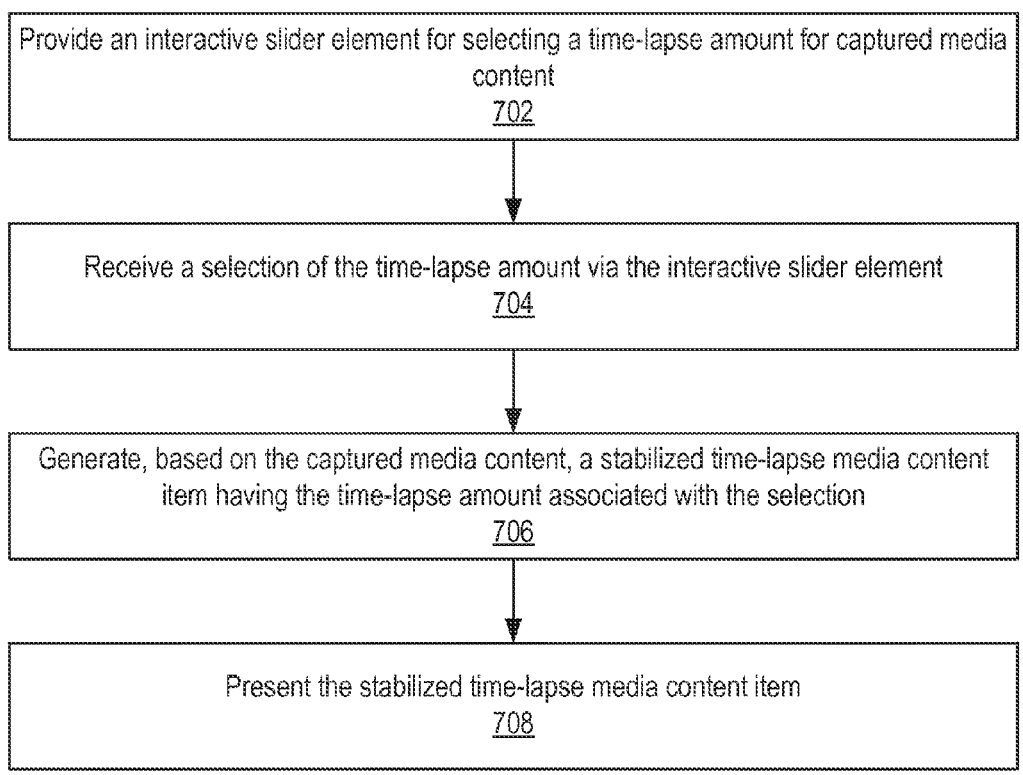
FIG. 7 illustrates an example method associated with providing interactive time-lapse selection for captured media content, according to an embodiment of the present disclosure.

FIG. 7 illustrates an example method 700 associated with providing interactive time-lapse selection for captured media content, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can provide an interactive slider element for selecting a time-lapse amount for captured media content. At block 704, the example method 700 can receive a selection of the time-lapse amount via the interactive slider element. At block 706, the example method 700 can generate, based on the captured media content, a stabilized time-lapse media content item having the time-lapse amount associated with the selection. At block 708, the example method 700 can present the stabilized time-lapse media content item.

In some embodiments, a second selection of a second time-lapse amount can be received via the interactive slider element. A second stabilized time-lapse media content item having the second time-lapse amount associated with the second selection can be generated based on the captured media content. The second stabilized time-lapse media content item can be presented. In some instances, this can repeat for a third selection of a third time-lapse amount, a fourth selection of a fourth time-lapse amount, and so on. Any suitable number of selections is possible.

Moreover, in some embodiments, an option to store, at least temporarily, the stabilized time-lapse media content item can be provided. For example, there can be an option to save the stabilized time-lapse media content item to a camera roll or other storage element. In another example, the stabilized time-lapse media content item and/or the captured media content can be temporarily stored and can be edited at a later time.

Figure 8:
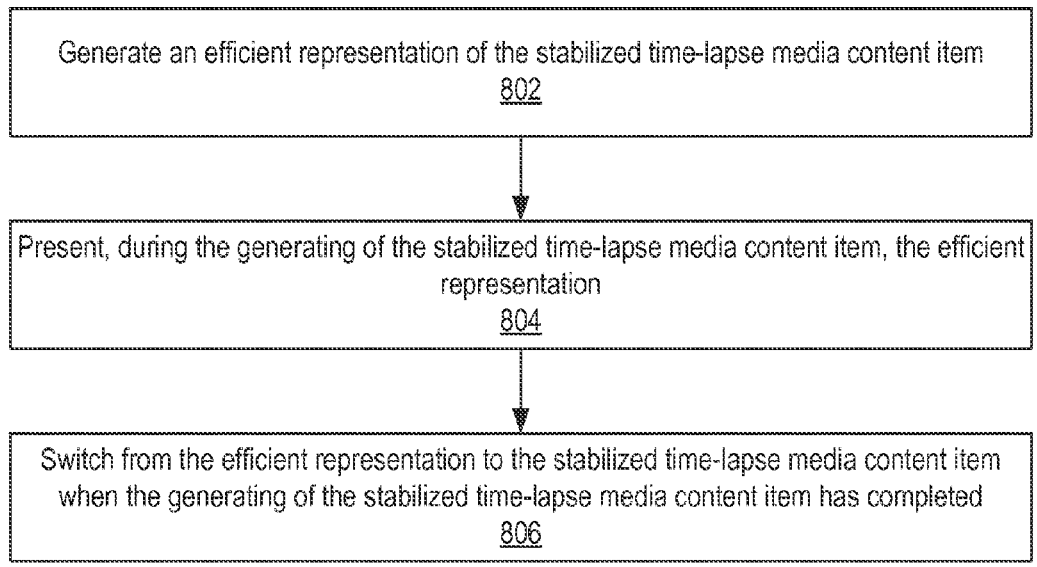
FIG. 8 illustrates an example method associated with providing interactive time-lapse selection for captured media content, according to an embodiment of the present disclosure.

FIG. 8 illustrates an example method 800 associated with providing interactive time-lapse selection for captured media content, according to an embodiment of the present disclosure. Again, it should be understood that there can be additional, fewer, or alternative steps performed in similar or alternative orders, or in parallel, within the scope of the various embodiments unless otherwise stated.

At block 802, the example method 800 can generate an efficient representation of the stabilized time-lapse media content item. At block 804, the example method 800 can present, during the generating of the stabilized time-lapse media content item, the efficient representation. At block 806, the example method 800 can switch from the presenting of the efficient representation to the presenting of the stabilized time-lapse media content item when the generating of the stabilized time-lapse media content item has completed.

It is contemplated that there can be many other uses, applications, and/or variations associated with the various embodiments of the present disclosure. In one example, disclosed technology can utilize another suitable interface element in addition to or as an alternative to the interactive slide element. In another example, the user can choose whether or not to opt-in to utilize the disclosed technology. The disclosed technology can also ensure that various privacy settings and preferences are maintained. In a further example, various embodiments of the present disclosure can learn, improve, and/or be refined over time.

Social Networking System—Example Implementation

Figure 9:
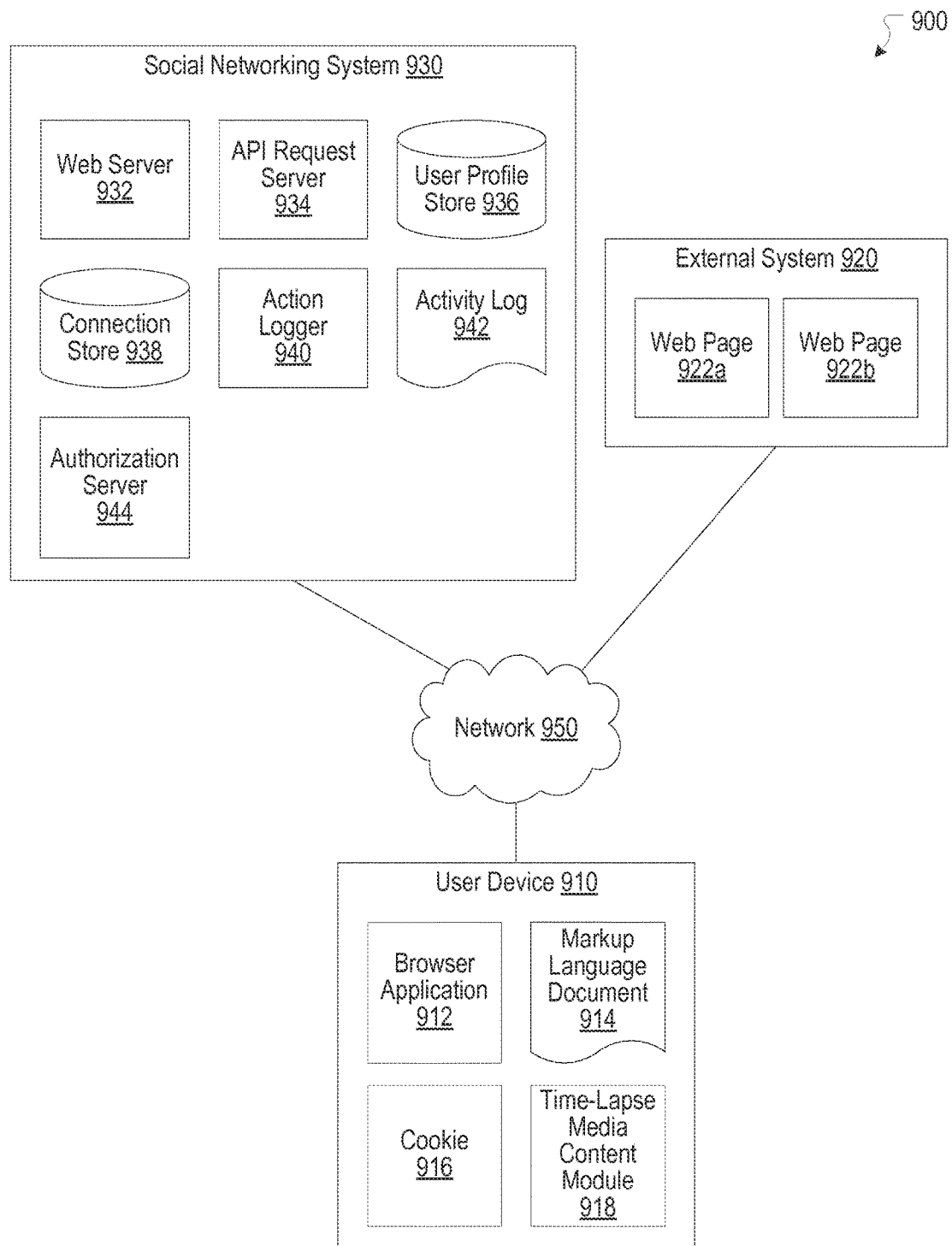
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices (or systems) that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the user device 910 can include a time-lapse media content module 918. The time-lapse media content module 918 can, for example, be implemented as the time-lapse media content module 102 of FIG. 1. Other features of the time-lapse media content module 918 are discussed herein in connection with the time-lapse media content module 102.

Hardware Implementation

Figure 10:
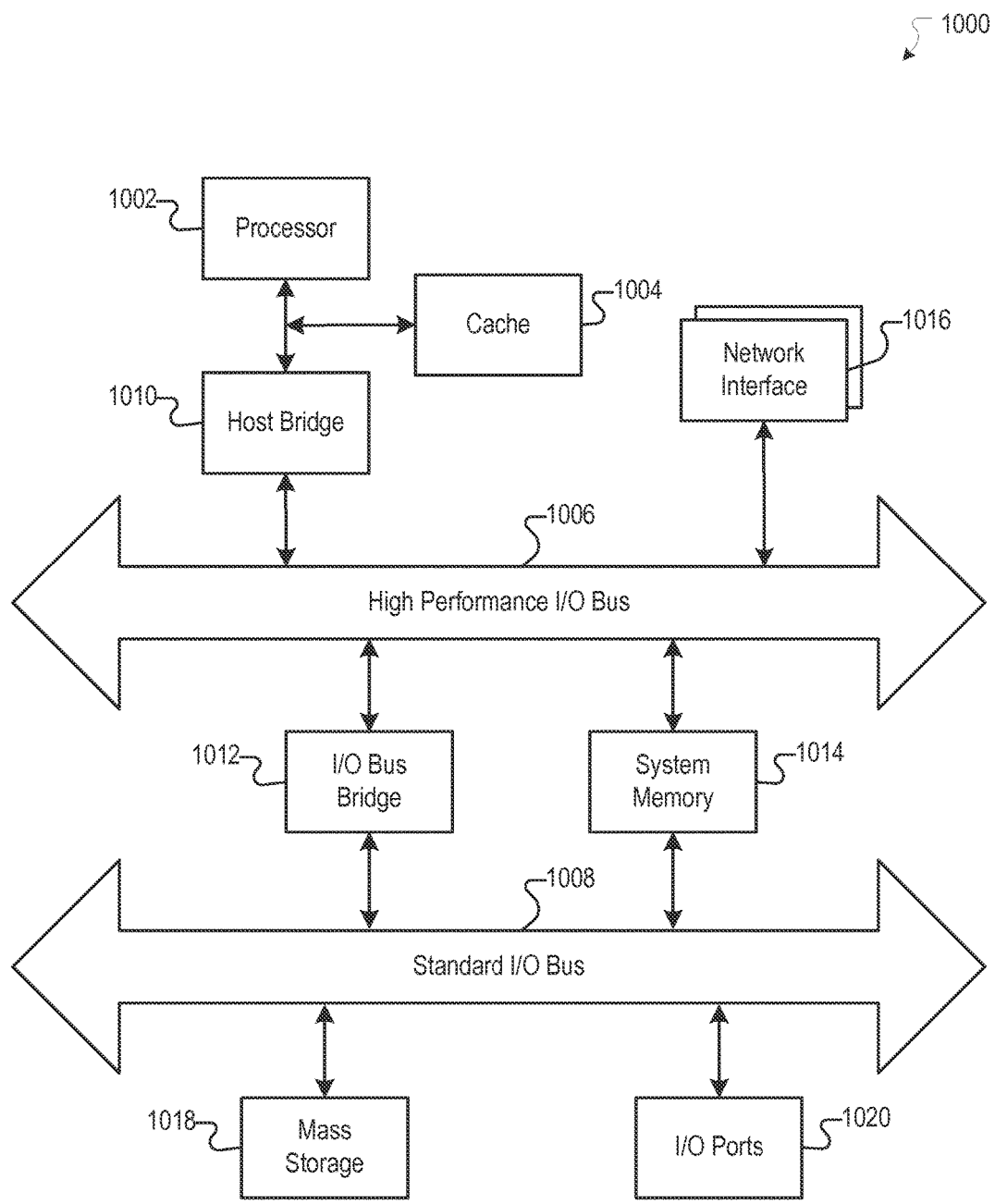
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing system, an interactive slider element including one or more discrete positions for selecting, via a user-specified rate value, a time-lapse rate for captured media content;
receiving, by the computing system, user selection of the time-lapse rate via the user-specified rate value;
providing, by the computing system, a stabilized time-lapse playback duration, wherein the stabilized time-lapse playback duration is updated in response to a change to the user-specified rate value;

generating, by the computing system, based on the captured media content, a stabilized time-lapse media content item having the time-lapse rate associated with the selection; and providing, by the computing system, the stabilized time-lapse media content item.

2. The computer-implemented method of claim 1, further comprising:

generating an efficient representation of the stabilized time-lapse media content item;

providing, during the generating of the stabilized time-lapse media content item, the efficient representation; and switching from the providing of the efficient representation to the providing of the stabilized time-lapse media content item when the generating of the stabilized time-lapse media content item has completed.

3. The computer-implemented method of claim 2, wherein the providing of the efficient representation is performed within an allowable time deviation from the receiving of the selection of the time-lapse amount via the interactive slider element.

4. The computer-implemented method of claim 2, wherein the generating of the efficient representation further comprises:

approximating at least some orientations associated with frames to be included in the stabilized time-lapse media content item, the frames being identified based on the time-lapse amount associated with the selection.

5. The computer-implemented method of claim 1, further comprising:

receiving a second selection of a second time-lapse amount via the interactive slider element;

generating, based on the captured media content, a second stabilized time-lapse media content item having the second time-lapse amount associated with the second selection; and providing the second stabilized time-lapse media content item.

6. The computer-implemented method of claim 1, wherein the interactive slider element provides a plurality of selectable time-lapse amount options, and wherein the selection of the time-lapse amount corresponds to one selectable time-lapse amount option out of the plurality of selectable time-lapse amount options.

7. The computer-implemented method of claim 1, wherein the plurality of selectable time-lapse amount options includes at least one of a 1× time-lapse amount option, a 2× time-lapse amount option, a 4× time-lapse amount option, a 6× time-lapse amount option, an 8× time-lapse amount option, a 10× time-lapse amount option, or a 12× time-lapse amount option.

8. The computer-implemented method of claim 1, further comprising:

providing a captured media content playback duration.

9. The computer-implemented method of claim 1, further comprising:

providing an indication of the time-lapse amount within an allowable time deviation from the receiving of the selection of the time-lapse amount, wherein the indication fades over time.

10. The computer-implemented method of claim 1, further comprising:

providing an option to store, at least temporarily, the stabilized time-lapse media content item.

11. A system comprising:

at least one processor; and a memory storing instructions that, when executed by the at least one processor, cause the system to perform:

providing an interactive slider element including one or more discrete positions for selecting, via a user-specified rate value, a time-lapse rate for captured media content;

receiving user selection of the time-lapse rate via the user-specified rate value;

providing a stabilized time-lapse playback duration, wherein the stabilized time-lapse playback duration is updated in response to a change to the user-specified rate value;

generating, based on the captured media content, a stabilized time-lapse media content item having the time-lapse rate associated with the selection; and providing the stabilized time-lapse media content item.

12. The system of claim 11, wherein the instructions cause the system to further perform:

generating an efficient representation of the stabilized time-lapse media content item;

providing, during the generating of the stabilized time-lapse media content item, the efficient representation; and switching from the providing of the efficient representation to the providing of the stabilized time-lapse media content item when the generating of the stabilized time-lapse media content item has completed.

13. The system of claim 12, wherein the generating of the efficient representation further comprises:

approximating at least some orientations associated with frames to be included in the stabilized time-lapse media content item, the frames being identified based on the time-lapse amount associated with the selection.

14. The system of claim 11, wherein the instructions cause the system to further perform:

receiving a second selection of a second time-lapse amount via the interactive slider element;

generating, based on the captured media content, a second stabilized time-lapse media content item having the second time-lapse amount associated with the second selection; and providing the second stabilized time-lapse media content item.

15. The system of claim 11, wherein the instructions cause the system to further perform:

providing a captured media content playback duration.

16. A non-transitory computer-readable storage medium including instructions that, when executed by at least one processor of a computing system, cause the computing system to perform:

providing an interactive slider element including one or more discrete positions for selecting, via a user-specified rate value, a time-lapse rate for captured media content;

receiving user selection of the time-lapse rate via the user-specified rate value;

providing a stabilized time-lapse playback duration, wherein the stabilized time-lapse playback duration is updated in response to a change to the user-specified rate value;

generating, based on the captured media content, a stabilized time-lapse media content item having the time-lapse rate associated with the selection; and providing the stabilized time-lapse media content item.

17. The non-transitory computer-readable storage medium of claim 16, wherein the instructions cause the computing system to further perform:
- generating an efficient representation of the stabilized time-lapse media content item;
- providing, during the generating of the stabilized time-lapse media content item, the efficient representation; and
- switching from the providing of the efficient representation to the providing of the stabilized time-lapse media content item when the generating of the stabilized time-lapse media content item has completed.

18. The non-transitory computer-readable storage medium of claim 17, wherein the generating of the efficient representation further comprises:
- approximating at least some orientations associated with frames to be included in the stabilized time-lapse media content item, the frames being identified based on the time-lapse amount associated with the selection.

19. The non-transitory computer-readable storage medium of claim 16, wherein the instructions cause the computing system to further perform:
- receiving a second selection of a second time-lapse amount via the interactive slider element;
- generating, based on the captured media content, a second stabilized time-lapse media content item having the second time-lapse amount associated with the second selection; and
- providing the second stabilized time-lapse media content item.

20. The non-transitory computer-readable storage medium of claim 16, wherein the instructions cause the computing system to further perform:
- providing a captured media content playback duration.

* * * * *